United States Patent Office 2,786,952
Patented Mar. 26, 1957

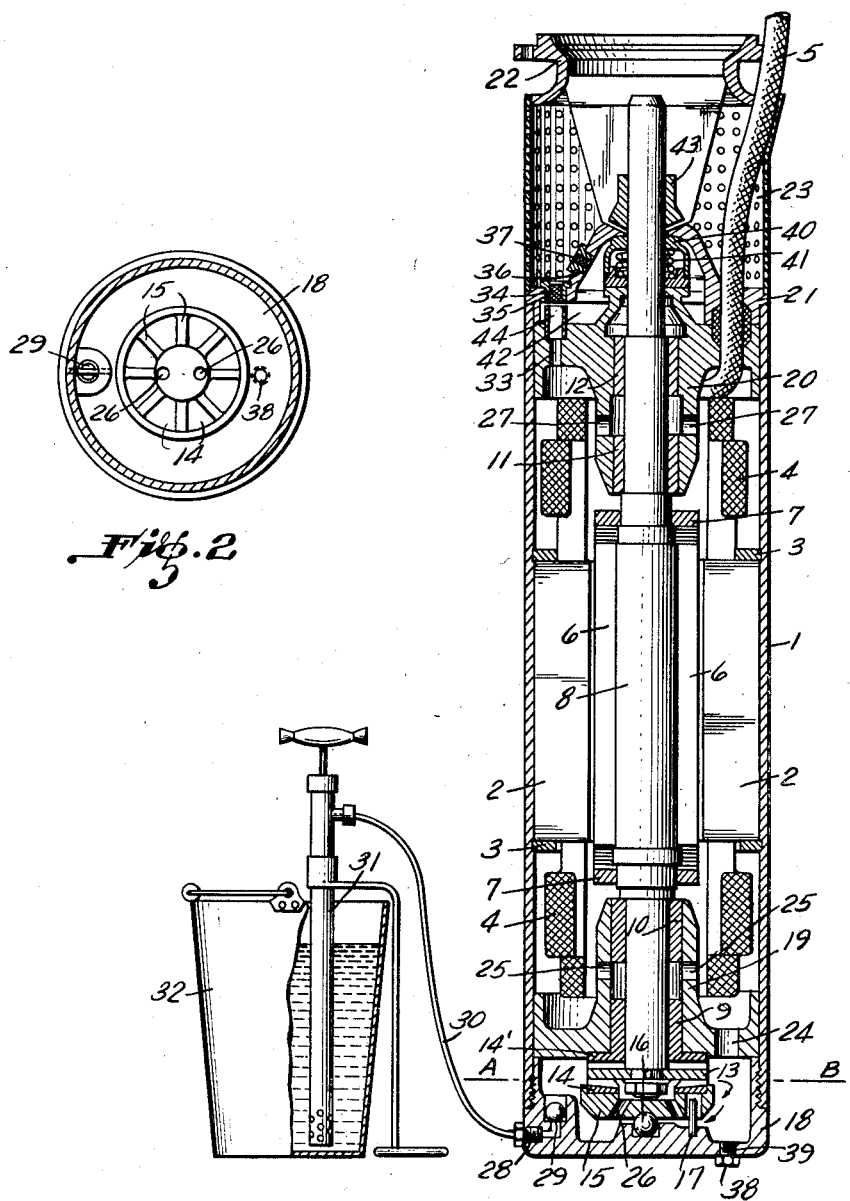

2,786,952

SUBMERSIBLE ELECTRIC MOTOR

Friedrich W. Pleuger, Hamburg, Germany

Application May 29, 1952, Serial No. 290,755

3 Claims. (Cl. 310—87)

This invention relates to submersible electric motors, and more particularly to improvements in means which are provided to insure good working characteristics and sufficient reliability of an electric induction motor of the squirrel cage type filled with water, which motor is to work submersed under water. Submersible electric motors of this type are used for driving operator machines as e. g. deep well pumps forming an aggregate with them.

It is a conventional practice to apply submersible electric motors with vertical shaft, which at their upper and lower ends are provided with filters so as to clean the water entering the interior from outside. Filters of this type solely have mechanical but in no way chemical effects on the water, though they are capable of protecting the motor against sand and other contaminations of the water, they are not suitable for diminishing the chemical aggressiveness of the water, and besides they are easily choked up. It is a further disadvantage of these filters that they cause the water to flow through the whole of the motor, hence all sensitive parts of the motor are subjected to corrosional dangers when chemically aggressive water is applied. If the water filling the motor is employed for lubricating the motor shaft bearings it is therefore of decisive importance for the life time and working reliability of the motor that the water does neither have mechanical contaminations nor chemical aggressiveness, which requirements are not met by those filters applied in common practice.

A further disadvantage of water-filled submersible electric motors of the so-called "wet" type is that the stator field windings consist of wires of a waterproof insulating rubber coat of considerable thickness in comparison to the insulations of normal electric motors. It is therefore obvious that the number of wires provided in the grooves of the stator laminations is very limited, whereby the economic value of the motor is diminished. This is of particular disadvantage with motors lowered into narrow bore holes, since it is impossible to achieve greater performances of the motors on account of their small diameters and of the thickness of the insulating rubber coat. Moreover, rubber tends to become brittle and porous by the time so that the water may penetrate into the windings.

The principal object of this invention is to provide a new construction of a water-filled submersible electric motor, in which the shortcomings of the constructions known until now are avoided, and which motor, irrespective of a small diameter and simple and cheap construction ensures great performances and discloses a good working reliability and efficiency for longer times, also when installed into a deep well.

A further object is to provide means ensuring the motor to be filled with pure water and preventing the existence of air bubbles, which favor corrosions in the interior of the motor.

It is a further object to provide all members of the motor in such a manner that they are simultaneously insulated and protected against corrosion so that the motor is prevented from being injured, also when operating in chemically aggressive water.

The way in which the above mentioned and other objects of the invention are realized is to be seen from the following detailed specification of a modified form of the invention, in which reference is made to the enclosed drawing showing a submersible electric motor designed for actuating a deep well pump.

In the accompanying drawings, Fig. 1 is a longitudinal sectional view of a motor according to the invention provided with a device for filling water into the interior of the motor. Fig. 2 is a cross sectional view of the line A—B of Fig. 1.

Referring now to Fig. 1 of the drawings, the electric three phase alternating current motor of the squirrel cage type is provided with a tubular casing 1, into which the laminated stator core 2 is installed, which is held by both the rings 3 engaging with corresponding circumferential grooves of the casing 1. The field windings 4 are provided in the grooves of the laminated stator core 2, which grooves are not shown in the drawing. The wires of these field windings 4 are coated with a liquid-proof insulating material on the basis of a superpolymerous ethylene, e. g. polyethylene. This material does not admit any water at all and also does not embrittle, further thereto it is of greater insulative strength. It is therefore possible to provide this insulating coat relatively thin in comparison to rubber or other plastic insulation materials, hence more wires may be provided in the grooves of the laminated stator core 2 than possible with the wires insulated with other common insulating materials. By this increase of the number of wires in the stator grooves an increase of the motor performance is achieved without increasing the diameter of the laminated stator core. Besides, polyethylene offers the further advantage of being thermoplastic. One may therefore easily complete the waterproofness of the windings by fusion welding the respective insulating coat ends of the single winding parts. The field windings 4 are connected to a cable 5 which leads to a three phase alternating current supply and which is provided with a liquid-proof insulation. This insulation is preferable to consist of polyethylene too, thus, by a fusion welding process, a liquid-proof connection between the windings and the cable, both consisting of thermoplastic polyethylene, is achieved.

The laminated core 6 of the rotor is provided with a squirrel cage winding with end rings 7 and is secured to the motor shaft 8, the lower part of which is guided in the journal bearings 9 and 10, the upper part being guided in the journal bearings 11 and 12. A disk 13 is secured to the lower end of the motor shaft 8, which disk is supported from below by a thrust bearing 14 and from above by a counterthrust bearing 14'. The case 15 of the thrust bearing 14 is tiltably and freely supported on a ball 16 and held in its position by a bolt 17 engaging with an axial groove of the case 15 of the thrust bearing 14 and fastened to the lower cap 18, which cap is screwed to the motor casing 1. The ball 16 is held in place by a coresponding deepening of the cap 18.

The lower journal bearings 9 and 10 are located in a case 19, which is fastened to the cap 18 of the motor casing, whereas the upper journal bearings 11 and 12 are arranged in a case 20 fitted into the motor casing 1 and held in place by the top cover plate 21 of the casing, which cover plate forms a unit with the flange 22 for connecting a pump with the motor. Further thereto, the top cover plate 21 is provided with a sieve screen 23 encircling the suction opening of the pump, which is not shown in the drawing.

The motor is immersed into the liquid to be pumped, e. g. water, and entirely filled with pure water. This water is utilized for film lubrication of the bearings, The journal bearings 9, 10, 11 and 12 are consisting of a material well suitable for water lubrication, e. g. of a plastic material or of ebonite, which materials are graphite-containing. The slide surfaces of the thrust bearing 14 are of the same graphite-containing material and, according to Fig. 2, consist of a plurality of sectorous elements fitted between radial ribs of the case 15 of the thrust bearing 14 and firmly connected with the case 15.

So as to ensure proper slide characteristics of the various bearing surfaces consisting of a graphite-containing material and to maintain a good lubrication in all parts subject to friction it is necessary that they are continuously flooded by water. This requirement is met by axial conduits 24 and radial conduits 25 in the lower bearing case 19, while the case 15 of the thrust bearing 14 is provided with conduits 26. The upper bearing case 20 is provided with radial conduits 27. By this arrangement of conduits the water is enabled to pass all bearing surfaces and is held in continuous circulation.

So as to attain good working characteristics, also when the motor is immersed into aggressive water, the motor is filled with pure water before being lowered into the bore hole. For this purpose an opening 28 is provided in the lower cap 18, in which opening a check valve 29 is mounted. The water is filled into the motor by means of a tube 30, which at one end is connected to a hand operated pump 31 and at its other end to the opening 28 of the motor. The pure water is supplied by a tank 32. So as to prevent air bubbles in the interior of the motor the upper bearing case 20 is provided with a conduit 33, above which an opening 35 closed by a filter 34 is provided in the top cover plate 21, in which also a second opening 36 closed by a filter 37 is provided above the opening 35. While the motor is being filled with water both the filters 34 and 37 are removed, hence all air may leave the interior of the motor. It is the purpose of this arrangement to achieve a better security against air bubbles in the interior of the motor by filling in the water through the lower opening 28, which effect is not to be achieved by filling in the water from above. When the motor is completely filled with water the tube 30 is removed and the openings 35 and 36 are closed by the filters 34 and 37. The lower cap 18 of the casing is provided with a bore 39 closed by a screw 38 so as to facilitate the water removal from the motor when repairs are necessary.

The heat arising during operation of the motor results in an expansion of the water contained in the motor, in which case the water may leave the interior of the motor by penetrating through the filters 34 and 37. When the motor is put out of circuit, the water will cool and flow back through these filters into the interior of the motor. By the difference in height of the filters 34 and 37 a good ventilation is achieved since an overpressure in height of a water column corresponding to the distance of the upper filter 37 from the water level within the motor is exercised on an air chamber enclosed by the upper portion of the cover plate 21, which overpressure drives the air through the filter 37, thereby overcoming its resistance, while the water may freely flow into the interior of the motor by means of the lower filter 34.

The point, in which the motor shaft 8 leaves the cover plate 21 is made water-proof by a graphite disk 40, which is secured to the shaft 8 and pressed against the bore of the cover plate 21 by means of a spring 41, the disk 40 thereby forms a tight packing. In case certain contaminations of the water in the bore hole should have penetrated through the narrow gap between the disk 40 and the shaft 8, they are stopped in a chamber 42 provided between the bearing case 20 and the cover plate 21 of the casing. It has been experienced that, after longer times of operation, this chamber 42 contains sand and mud, which are thus prevented from further penetrating into the interior of the motor, and especially are kept away from the most sensitive thrust bearing 14. A further safeguard against penetration of contaminations at the leaving point of the shaft 8 is the ring 43, the lower side of which and the correspondent portion of the cover plate 21 form a narrow gap. The contaminations gathered in the chamber 42 are further prevented from penetrating into the interior of the motor by a tube portion 44 provided above the bore 33.

It is a particular advantage of the filters 34, 37 arranged in the cover plate 21 of the casing and of the closed shape of the lower cap 18 of the casing that the water externally flooding the motor may enter the motor at its upper end only and is filtered by the filters 34, 37. If the motor is working submersed in aggressive water, this, on account of the above described arrangement, does not flow through the whole of the motor as this would be the case when providing the filters in the common arrangement at the bottom and top of the motor. The contaminations of the water entering from outside, which are likely to gather at the filters 34 and 37, are sure to be washed away by the pressure of the water expanding within the motor after a certain time of operation.

So as to protect against corrosion the metallic members of the motor they are provided with a coat consisting of a synthetic material as e. g. a polyamide. This coat protects the laminated stator core 2, both the internal and external side of the motor casing 1 with its covers 18 and 21 and the bearing cases 19 and 20.

The foregoing description of the invention is explanatory thereof and various changes in the size, shape and materials, as well as in the details of the illustrated construction may be made, within the scope of the appended claims, without departing from the spirit of the invention.

Having thus described my invention, my claims are:

1. A submersible electric motor, comprising, in combination, an elongated casing adapted to be filled with water, a motor shaft extending through the casing, a stator core mounted within said casing; a squirrel cage type rotor rotatable along with said shaft and cooperating with said stator core, a thrust bearing at one end of said shaft, a lower cap connected with said thrust bearing and said casing, an upper bearing case located within said casing and enclosing the opposite end of said shaft, a dome-shaped top cover plate located at a distance from said upper bearing case and also enclosing said opposite end of the shaft, whereby a chamber is formed between said top cover plate and said upper bearing case, said upper bearing case having a passage formed therein, said top cover plate having two breather openings formed therein and located at different levels, said breather openings connecting said chamber with the space above said top cover plate, filters in said breather openings, whereby water outside of said casing is purified prior to its penetration into said chamber and whereby water may leave the interior of said casing on heating and reenter it on cooling, and means connected with said lower cap for supplying pure water to the interior of said casing.

2. A submersible electric motor, comprising, in combination, an elongated casing adapted to be filled with water, a motor shaft extending through the casing, a stator core mounted within said casing, a squirrel cage type rotor rotatable along with said shaft and cooperating with said stator core, a disk upon one end of said shaft, a thrust bearing and a counter-thrust-bearing supporting said disk on opposite sides, a lower cap connected with said casing, a ball carried by said lower cap and supporting said thrust bearing, a top cover plate enclosing the opposite end of said shaft, said top cover plate having breather openings formed therein at different levels and interconnecting the spaces on opposite sides of said cover plate, filters in said breather openings whereby water outside of said casing is purified prior to its penetration into the interior of said casing and whereby water may leave the interior of said casing on heating and reenter it on cooling, and means connected with said lower cap for supplying pure water to the interior of said casing.

3. A submersible electric motor, comprising, in combination, an elongated casing adapted to be filled with water, a motor shaft extending through the casing, a stator core mounted within said casing, a squirrel cage type rotor rotatable along with said shaft and cooperating with said stator core, a thrust bearing at one end of said shaft, two aligned water-lubricated bearings supporting said end of the shaft, means connecting said bearings with said casing and exposing a portion of the shaft located between the bearings, a lower cap connected with said perforated means, said thrust bearing and said casing, two aligned water-lubricated bearings supporting the opposite end of said shaft, a top cover plate enclosing said opposite end of said shaft, separate means connecting the second-mentioned bearings with said casing and said top cover plate and exposing a portion of the shaft located between the second-mentioned bearings, said top cover plate having at least one breather opening formed therein and interconnecting the spaces on opposite sides of said cover plate, a filter in said breather opening whereby water outside of said casing will be purified prior to its penetration into the interior of said casing and whereby water may leave the interior of said casing on heating and reenter it on cooling, and means connected with said lower cap for supplying pure water to the interior of said casing.

References Cited in the file of this patent

UNITED STATES PATENTS

| | | |
|---|---|---|
| 856,245 | Gamon | June 11, 1907 |
| 1,454,041 | Cramer | May 8, 1923 |
| 2,043,236 | Conant | June 9, 1936 |
| 2,568,548 | Howard | Sept. 18, 1951 |
| 2,570,682 | Imbert | Oct. 9, 1951 |
| 2,573,126 | Andrus | Oct. 30, 1951 |
| 2,600,277 | Smith | June 10, 1952 |

FOREIGN PATENTS

| | | |
|---|---|---|
| 423,689 | Great Britain | Feb. 6, 1935 |